US 8,495,008 B2

(12) United States Patent
Ewing et al.

(10) Patent No.: US 8,495,008 B2
(45) Date of Patent: Jul. 23, 2013

(54) APPLICATION-AWARE RECORDING AND REPLAY

(75) Inventors: Douglas C. Ewing, Fairport, NY (US); Satyendra Kumar, Austin, TX (US); Cheranellore Vasudevan, Bastrop, TX (US)

(73) Assignee: International Business Machines Corporation, Armonk, NY (US)

( * ) Notice: Subject to any disclaimer, the term of this patent is extended or adjusted under 35 U.S.C. 154(b) by 1317 days.

(21) Appl. No.: 12/251,242

(22) Filed: Oct. 14, 2008

(65) Prior Publication Data

US 2010/0095265 A1    Apr. 15, 2010

(51) Int. Cl.
*G06F 17/30* (2006.01)
(52) U.S. Cl.
USPC .......................................... 707/609
(58) Field of Classification Search
None
See application file for complete search history.

(56) References Cited

U.S. PATENT DOCUMENTS

| 6,573,915 | B1 | 6/2003 | Sivan et al. | |
| 2004/0041827 | A1 | 3/2004 | Bischof et al. | |
| 2005/0004954 | A1* | 1/2005 | Soule, III | 707/203 |
| 2005/0278458 | A1* | 12/2005 | Berger et al. | 709/248 |
| 2005/0283564 | A1* | 12/2005 | LeCrone et al. | 711/100 |
| 2006/0005132 | A1 | 1/2006 | Herdeg, III | |
| 2006/0190498 | A1* | 8/2006 | Pruet, III | 707/202 |
| 2006/0190503 | A1* | 8/2006 | Naicken et al. | 707/204 |
| 2008/0082669 | A1* | 4/2008 | Williams et al. | 709/227 |
| 2010/0057748 | A1* | 3/2010 | Ensor et al. | 707/10 |

OTHER PUBLICATIONS

Lee et al., "Operation Shipping for Mobile File Systems", IEEE Transactions on Computers, vol. 51, No. 12, Dec. 2002, pp. 1410-1422.

* cited by examiner

*Primary Examiner* — Bai D. Vu
(74) *Attorney, Agent, or Firm* — Yee & Associates, P.C.; Steven L. Bennett

(57) ABSTRACT

In one illustrative embodiment, a computer-implemented method for application-aware recording and replay of changes is provided. The computer implemented method executes an application in a source system to form a first domain context, and generates recorded information objects from the application in the first domain context. The computer-implemented method selects a target system having a second domain context, and replays the recorded information objects on the target system to form new information objects in the second domain context. The new information objects are returned to a requester.

20 Claims, 5 Drawing Sheets

APPLICATION-AWARE RECORDING AND REPLAY

BACKGROUND OF THE INVENTION

1. Field of the Invention

The present invention relates generally to an improved data processing system, and, more specifically, to a computer implemented method, a data processing system, and a computer program product for application-aware recording and replay of changes.

2. Description of the Related Art

On many occasions, there may be a need to record the changes in a system due to user interactions. The recording may be necessary for a variety of applications like transaction logging in a database system, regression testing by applying, or replaying the same interactions on different versions of the system, applying the same changes to more than one system, such as system configuration upgrades, applying the same changes to a different system when the interactions were initiated on a wrong target, or to perform "what if" analysis of one or more changes to different systems. In many of these situations, the type of information to be recorded could be application-specific so that the information gathering and storage can be made more stable and efficient.

The current practice of user interaction recording is based on interface-specific data like controls, type of controls (such as drop-down versus checkboxes), layout of the controls within a page, or in other cases, usage of an application programming interfaces. The current practice typically leads to failures in accurately replaying the recordings when any of the interface details change. Interface changes may include changing a control type or moving a control is from one page to another, causing a change in the layout and the availability of controls.

The replay may also be governed by application-specific rules to handle different types of target systems and unexpected mismatches, and errors may occur. The mismatch and error issues may lead to numerous maintenance issues, as well as an inability to persist the pre-recorded user interactions. There is a need to provide more effective recording of user interactions and replay of those recorded interaction.

BRIEF SUMMARY OF THE INVENTION

According to one embodiment of the present invention, a computer-implemented method for application-aware recording and replay of changes is provided. The computer-implemented method executes an application in a source system to form a first domain context, and generates recorded information objects from the application in the first domain context. The computer-implemented method selects a target system having a second domain context, and replays the recorded information objects on the target system to form new information objects in the second domain context. The new information objects are returned to a requester.

In another embodiment, a data processing system for application-aware recording and replay of changes is provided. The data processing system comprises a bus, a memory connected to the bus, wherein the memory comprises computer-executable instructions, and a processor unit connected to the bus. The processor unit executes the computer-executable instructions to direct the data processing system to execute an application in a source system to form a first domain context, generate recorded information objects from the application in the first domain context, select a target system having a second domain context, replay the recorded information objects on the target system to form new information objects in the second domain context, and return the new information objects to a requester.

In yet another embodiment, a computer program product for application-aware recording and replay of changes is provided. The computer program product comprises a computer-usable, recordable type medium having computer-executable instructions stored thereon. The computer-executable instructions comprise computer-executable instructions for executing an application in a source system to form a first domain context, computer-executable instructions for generating recorded information objects from the application in the first domain context, computer-executable instructions for selecting a target system having a second domain context, computer-executable instructions for replaying the recorded information objects on the target system to form new information objects in the second domain context, and computer-executable instructions for returning the new information objects to a requester.

DETAILED DESCRIPTION OF THE INVENTION

Figure 1:
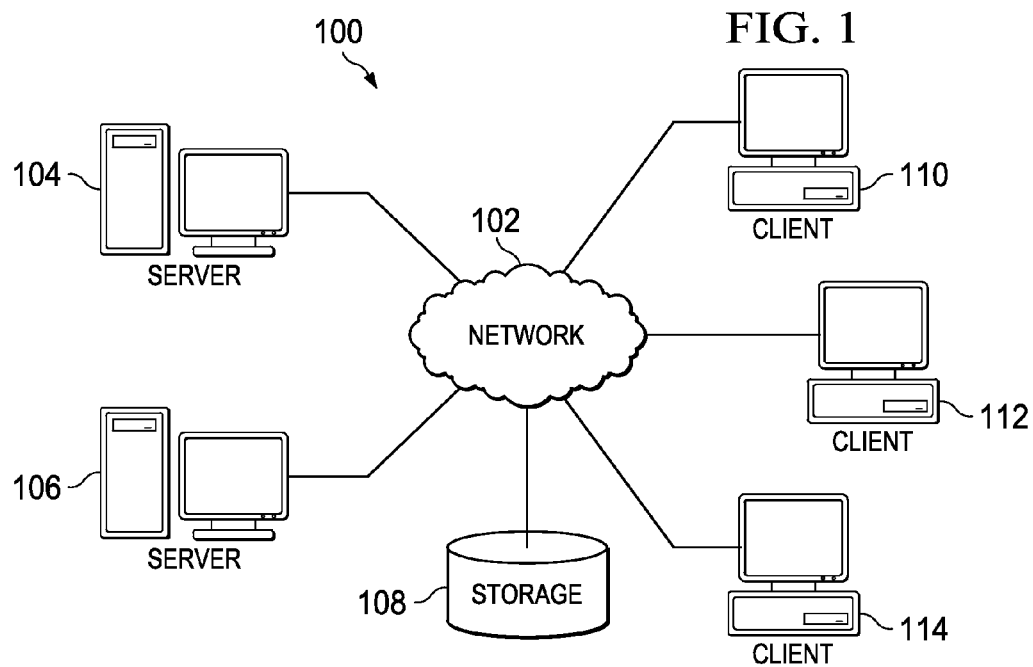
FIG. 1 depicts a pictorial representation of a network of data processing system, in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to, wireless, wire line, optical fiber cable, RF, etc.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus, to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture, including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer implemented process such that the instructions which execute on the computer, or other programmable apparatus, provide processes for implementing the functions/acts specified in the flowchart and/or block diagram block or blocks.

Figure 2:
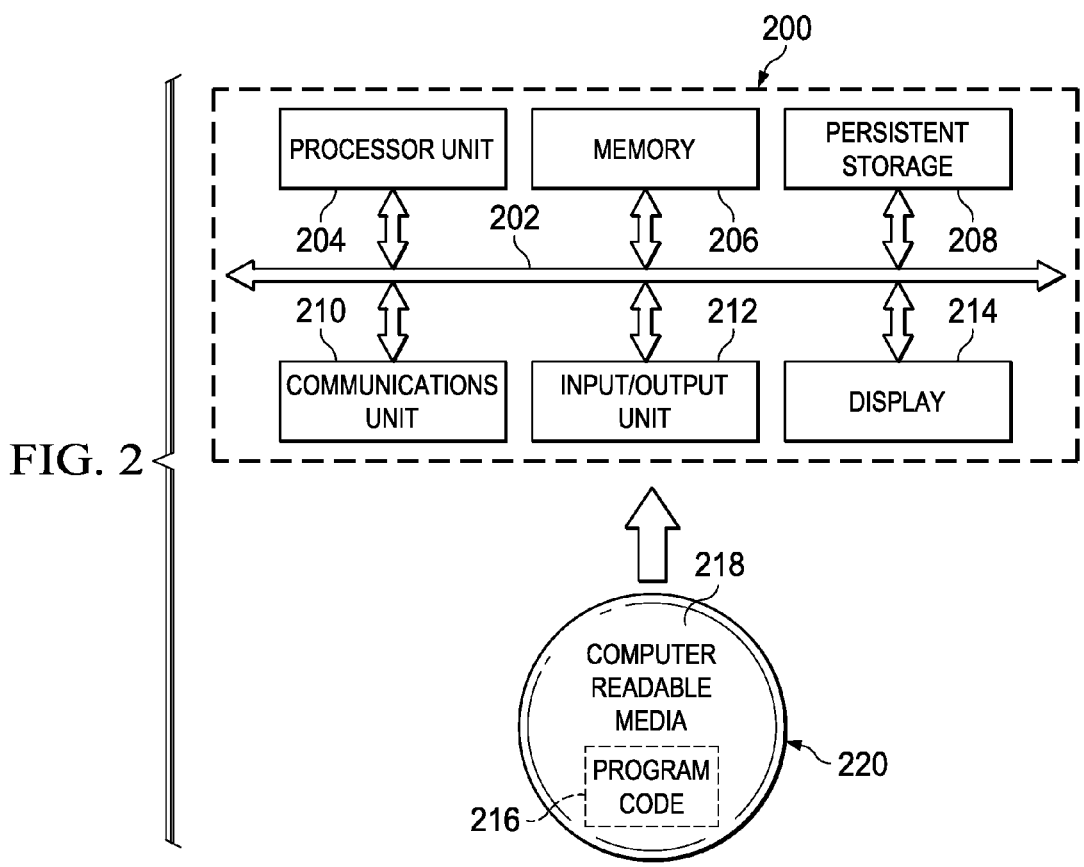
FIG. 2 is a block diagram of a data processing system, in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system, in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102, along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

In one illustrative embodiment using the example of system 100 of FIG. 1, a computer implemented method for application-aware recording and replay of changes is provided. The computer-implemented method executes an aware application in a source system, such as server 104, to record the results of user interaction from a user on a client, such as client 110 through network 102, with the application. Results are recorded during the execution to generate recorded information objects from the application in a first domain context. The computer-implemented method further selects a target system, in a second domain context, such as server 106, which may be a similar system to that of server 104 or a different environment. A replay of the recorded information objects on the target system forms new information objects. The results are returned as the new information objects to the requester on client 110.

With reference now to FIG. 2, a block diagram of a data processing system is shown, in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors, or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information, either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto, or transferred to, data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202, and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
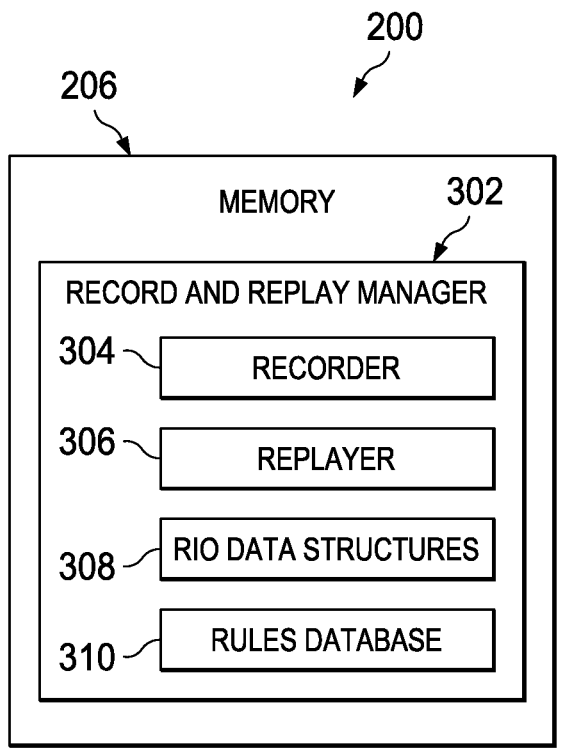
FIG. 3 is a block diagram showing high-level components of a record and play manager, in accordance with an illustrative embodiment.

With reference to FIG. 3, a block diagram showing high-level components of a record and replay manager, in accordance with an illustrative embodiment is shown. Record and replay manager 302 is shown within memory 206 of system 200 of FIG. 2. Record and replay manager 302 may also be located in other memory locations suitable for execution of the functions, as needed. For example, record and replay manager 302 may be stored as program code 216, located in a functional form on computer-readable media 218, until installed for use or in persistent storage 208 ready for loading, as needed. Record and replay manager 302 contains a number of components comprising recorder 304, replayer 306, recorded information objects (RIO) data structures 308, and rules database 310.

Recorder 304 provides a capability to record user or component interactions. The object-based framework allows programmers to define application-specific rules to identify the changes to the internal system (application) that need to be recorded, and represent them as abstract generic "interaction objects." The rules are stored in rules database 310 for use by recorder 304, or replayer 306, as needed. The interaction objects are stored as recorded information objects in recorded information objects data structures 308. The interaction objects are context-sensitive with built-in methods to guide application replay, using replayer 306, of the recorded information to different target systems. Domain-specific (configuration, testing, taxation system, engineering designs, etc.)

information related to user interactions can be recorded and replayed in a different system context, if desired.

The source system is referred to as a first domain context, while the target system may be referred to as the second domain context. The first and second domains may be the same in some cases and may be different in other cases.

Typically, the user interactions create certain changes in the system. The objective of recorder 304 and associated rules of rules database 310 is to capture the changes by recording efficiently and then apply, by replay, the changes to other similar systems, either for the purpose of duplication or replaying in different target systems, as dictated by the respective domains.

Figure 4:
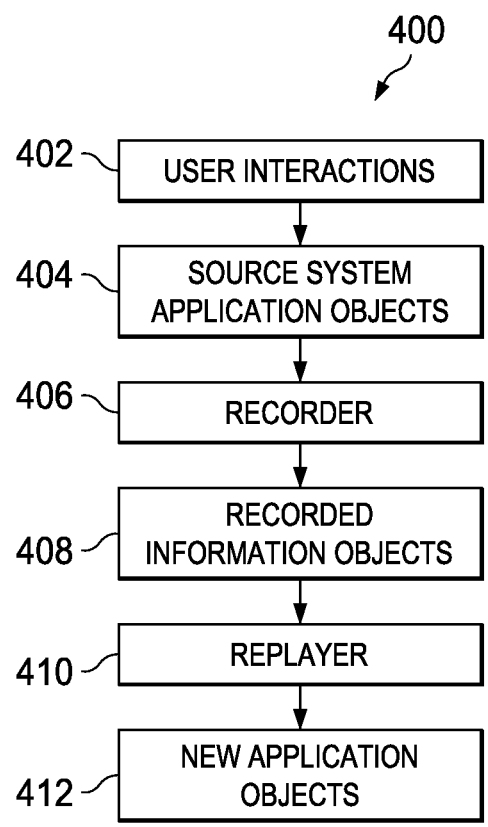
FIG. 4 is a block diagram of a data flow within a record and replay managed system, in accordance with an illustrative embodiment.

With reference to FIG. 4, a block diagram of a data flow within a record and replay managed system, in accordance with an illustrative embodiment, is shown. Record and replay system 400 is an example of using record and replay manager 302 of FIG. 3.

The framework of record and replay system 400 processes a set of source system application objects 404, which are modified as a result of user interactions 402. Source system application objects 404 are capable of identifying themselves as candidates for recording as a consequence of particular user actions. Source system application objects 404 carry information regarding the changes resulting from the user interactions. Based on the type of actions, certain standard impacts such as deletion, modification of a content or container, and selection can be identified. The operations and corresponding changes will depend on the specific application domain. For example, in user-interface testing, the application objects can be user-interface controls and the internal systems objects that are impacted by the user selections or user interactions 402.

The recording module of recorder 406 identifies the impacted source system application objects 404 and nature of the impacts (modification, addition, and deletion of object and object relationships). Recording creates a set of abstract interaction objects, known as recorded information objects (RIOs) 408. Recorded information objects 408 captures the minimal information necessary to reproduce or reapply the same impacts representing the original user actions or intent from the source system on similar application objects on a different target system. Recorded information objects 408 differs from a basic recorded action, such as a logged action. Logged information captures the specific concrete change in absolute terms. Recorded information objects 408 is a set of objects comprising one or more objects, as required for the instance being recorded and is more abstract than a logged change. The abstraction, using extensible markup language definitions for example, allow the replay of the recorded information objects in the target systems.

For example, when salary is increased by $100, representing a 5% change from the base salary for an employee, and when the same increase is applicable for all employees in the department, it is important to record that the change represents a 5% increase in basic pay, rather than a $100 increase. The salary change impacts a certain group of employees rather than a particular control on the user-interface and a particular value entered. The change is recorded in a functional manner rather than as an absolute change. Abstraction allows the functional information to be applied to another domain instance and have a similar result occur.

Replayer 410 reads recorded information objects 408 and applies them to a new target system instance. Recorded information objects 408 have rules or methods describing how to apply each of recorded information objects 408 in a changed system instance environment. For example, if a corresponding application object is missing, or there are different application objects in the new system instance, recorded information objects 408 behave differently, attempting to reproduce closely similar impacts as if the same user actions take place.

For example, the salary increase will be computed based on the corresponding current base pay and percentage of increase rather than the same fixed number entered in the original system. The rules provide a capability to abstract the concrete example provided in source system application objects 404. At the same time, the corresponding recorded information objects 408 understand the domain-specific rules of the source system application objects 404; that the salary increase is not applicable for executive employees. Here again, the domain-specific knowledge and rules govern the behavior of recorded information objects 408 during the replay by replayer 410. Replayer 410 is also capable of detecting and notifying a requester of any failures that occur in applying the originally recorded changes to the new system or environment in creating new application objects 412.

The generic framework provided by the described components enable the design of source system application object 404 classes to support change information recording, and the concept of recorded information objects 408, which are also application-aware to support effective re-application of the changes in a similar but new environment.

Recorder 406 captures the interaction between the user and system application objects 404. The idea of application and/or system-aware recording is to record information in a first domain context for replaying again in a second domain context without any change to the recorded information. The replaying may happen after the system representation, including its user-interface, has changed. To make the recorded information useful and economical for a playback, the recorded information avoids dependencies on elements that can change frequently. Elements that change frequently are typically part of the layout of the user-interface, object, or an object's properties that are not fundamental to the representation of the application state.

The system is formed so that the objects, core application objects, user-interface objects, various agents between source system application objects 404, and the user-interface objects, will notify recorder 406 of the changes. When an event triggered by user selection needs to be recorded, the user-interface will notify recorder 406 to record. Recorder 406 will manage the recording of information. Recorder 406 determines what to record by asking the objects what to save and where to save. The information can be captured in terms of dedicated objects, some changes on the system objects themselves, or some combination of the two in the form of recorded information objects 408.

Recorder 406 can record the interaction at various levels. In one level, raw selection with its external representation is a least-preferred level to record because the interaction is most removed from a system. Being far removed from the system means frequent changes can occur and, therefore, should be avoided. Typical existing testing applications like WinRunner (available from HP Mercury a subsidiary of the Hewlett-Packard Company), and Silk™ (available from Borland Software Corporation), record mostly at this level. For example, this level of recording would typically involve recorder 406 recording the user, selecting an item with a specified description in a drop-down list with a specified label.

Another level of recording, involving raw selection with its internal representation, is a second least-preferred level of information to record. Instead of capturing the selection in some control, the raw selection level of recording records the internal representation of the selection. For example, when the user selects a generic hard disk instead of recording the specific selection description, recorder 406 records the name of the internal entity representing the hard disk in the application, thereby avoiding the changes in the user-interface container. The application can change the user-interface layout, such as converting the drop-down list to a table implementation and this level of recording will still be able to be replayed without change to the recorded information.

In another level of recording, the focus is on the user's intention. At this level of recording, when a user makes a selection, the application can ask the user additional questions about intentions. For example, beside the hard-disk drop-down, the application can ask questions as to whether the user intends to add a hard drive of a specific size or speed. Capturing an intention may be more difficult, but may prove very useful unless the intention can almost always be found from the changes in the system.

In another level of recording, resulting changes in the application objects are recorded. The level of recording allows the best capability to capture the changes in the application objects because the changes in the representation of objects would not change that often. When a primary property of an object is changed, the object, on the change, can request recorder 406 to record the change. Changes in secondary properties that are byproducts of changes in the primary properties would not be recorded. If the application object representation does change, the application may be designed to map the recorded information before replaying. Some of the programming languages can save or serialize the application objects and reload later. Typically, a large quantity of information, sometimes even the whole memory representation, is saved but this would not be suitable for replaying if the application has changed, even if it has changed slightly.

Recorder 406 timestamps each of the actions or changes that need to be saved. The timestamps may be used as an index. Once the user is finished with the actions on the system, recorder 406 is requested to save the collected information. Recorder 406 processes the recorded information, either recorded with the system objects or the dedicated objects created solely for recording, and saves the recorded information in a file as recorded information objects 408. Replayer 410 uses recorded information objects 408 as input to replay on a different system.

Recorded information objects 408 represent the user actions in an abstract form as described in the description of recorder 406. Recorded information objects 408 comprises a set of recorded information objects, can have a syntax/format that is specific to an application, or may preferably be in application-independent format using a markup language definition, such as may be provided using extensible markup language (XML). These objects represent the abstract information of the user action. For example, clicking on a "Confirm" button sends the user-interface data for processing or validation, or the "add to cart"/"save" action represents a temporary saving of data. The internal operations should be represented in a general form such as "increase the input voltage by 10%" rather a more concrete example of "Enter 3.3" under "Input Voltage Control."

Replayer 410 acts when recorded information objects 408 needs to be applied to a new environment. Replayer 410 comprises necessary intelligent logic to interpret recorded information objects 408 and translate them into appropriate internal actions. The replay is not intended to simulate the same key strokes and actions on a user-interface as do other application test tools previously mentioned, but to perform the internal actions as recorded and replayed in the new context.

For example, when an "increase the input voltage by 10%" is recorded as an action, replayer 410 will have logic to perform a calculation using the specified input voltage of 15 V, and increase the value by 10%. The result to apply is 16.5 volts. This will be considered as the replay of the concrete example applying 3.3 volts when this action was originally recorded in the source system. Replayer 410 is aware that the replay context is different from the context in which the actions were recorded, and uses the capability of replaying the recorded information to modify or adapt the actions to the new target system context.

Replayer 410 also has logic to remove or replace certain steps or user-interface actions as relevant and applicable to the new context. Replayer 410 analyzes each of recorded information objects 408, and also examines the current context and modifies the content of recorded information objects 408, as relevant to the current context.

This modification is done based on domain-specific rules. For example, if a control is moved from one page to another page, it appropriately defers the application of the particular input until the new page is accessed. If a drop-down control such as a "Radio Button" is replaced, the syntax of the selection application is modified to suit the new "Radio Box" control. If the information recorded is "Increase voltage by 10%," replayer 410 will examine the current rated voltage, compute a new 110% value, and apply that value to the new context. If a particular control is replaced by two other controls, replayer 410 will identify how the "old" selection was recorded and determine what the new selection is in the new interface, using the rules. When a control is missing, the rules may not be able to provide a reasonable interpretation, causing replayer 410 to skip the selection recorded and notify the requester. An example schema representation, in an extensible markup language format code fragment, is shown in FIG. 5.

Figure 5:
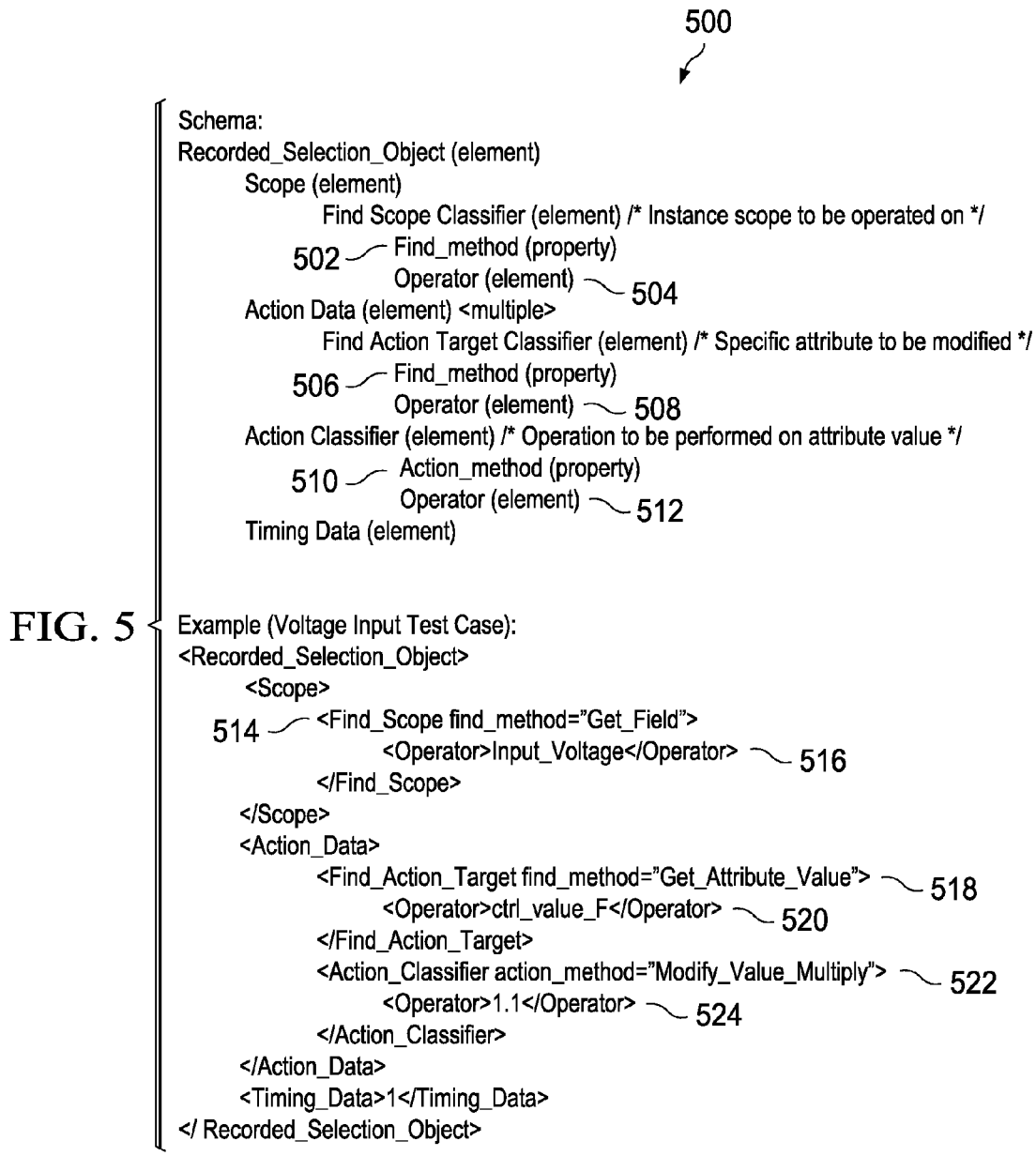
FIG. 5 is a text representation of an example of a recorded object definition, in accordance with an illustrative embodiment.

With reference to FIG. 5, a text representation of an example of a recorded information object definition, in accordance with an illustrative embodiment is shown. Schema fragment 500 is a code snippet that depicts a set of definitions for a recorded selection object comprising scope, action data, and timing portions.

The general structure defines a boundary or scope of operation, in which element 502 defines a property and element 504 defines an operator. A specific attribute that is to be modified is defined next, in which element 506 defines a property of the action attribute and element 508 defines instance of the attribute. Element 510 then defines an action to be performed on the attribute value of element 508. Element 512 defines an operation value used by the method of element 510.

For example, using a voltage input test case, element 514 defines a scope to be a "Get_Field" method and, more specifically, the portion defined by element 516 as "Input_Voltage." Element 518 defines a "Get_Attribute_Value" method being performed to retrieve a control value, as defined in element 520 of "ctrl_value." The control value is to be modified, as defined by element 522 "Modify_value_Multiply." The modify operation of element 522 will use the value supplied in element 524 of "1.1." The result is an operation that will adjust the input voltage of element 516 by 110%. The adjustment represents an increase of the stated 10% rather than a concrete amount. The change has been expressed in a more general form than if a specific amount was used. The general form allows for more flexibility on a replay operation.

Figure 6:
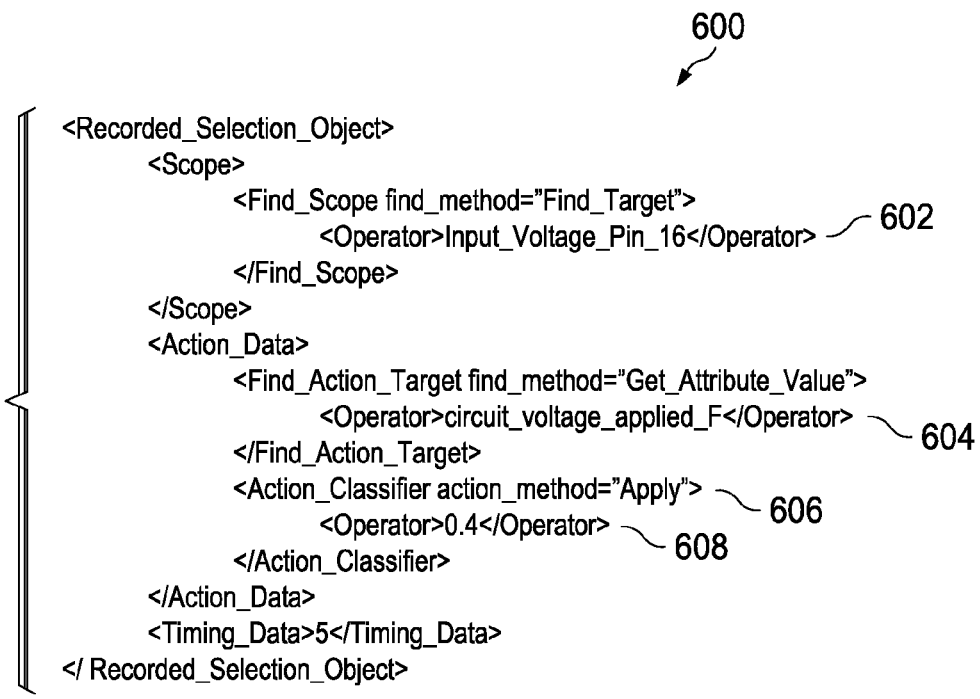
FIG. 6 is a text representation of another example of a recorded object definition in accordance with an illustrative embodiment.

With reference to FIG. 6, a text representation of another example of a recorded object definition, in accordance with an illustrative embodiment, is shown.

In the example, a voltage input test case for a circuit board is used. The objective of the test is to ensure that a pin on a processor chip (pin 16) receives a certain voltage. The voltage cannot be directly applied to the pin because the chip is seated in a circuit board. The voltage is applied at some external node on the circuit board. The source system of the example is represented by the circuit board and processor chip combination. The new system or target system is represented by a new circuit board with the same processor chip seated in it, has a new layout and, perhaps, new circuit elements. In the new target system, the circuit board has changed so the voltage applied at the external node will need to be different to achieve the same voltage application at pin 16.

Code snippet 600, in the example, is an extensible markup language (XML) code fragment that defines a portion of the recording section. Statement 602 defines the operator of interest as "input voltage pin 16" as previously stated. Statement 604 indicates action data with respect to the identified object of "pin 16" as "circuit applied voltage F."

Statement 606 indicates an action method of "apply" indicating a voltage will be applied to the object "pin 16." Statement 608 indicates that an operator of "0.4" is used with the applied voltage to achieve the desired result.

Figure 7:
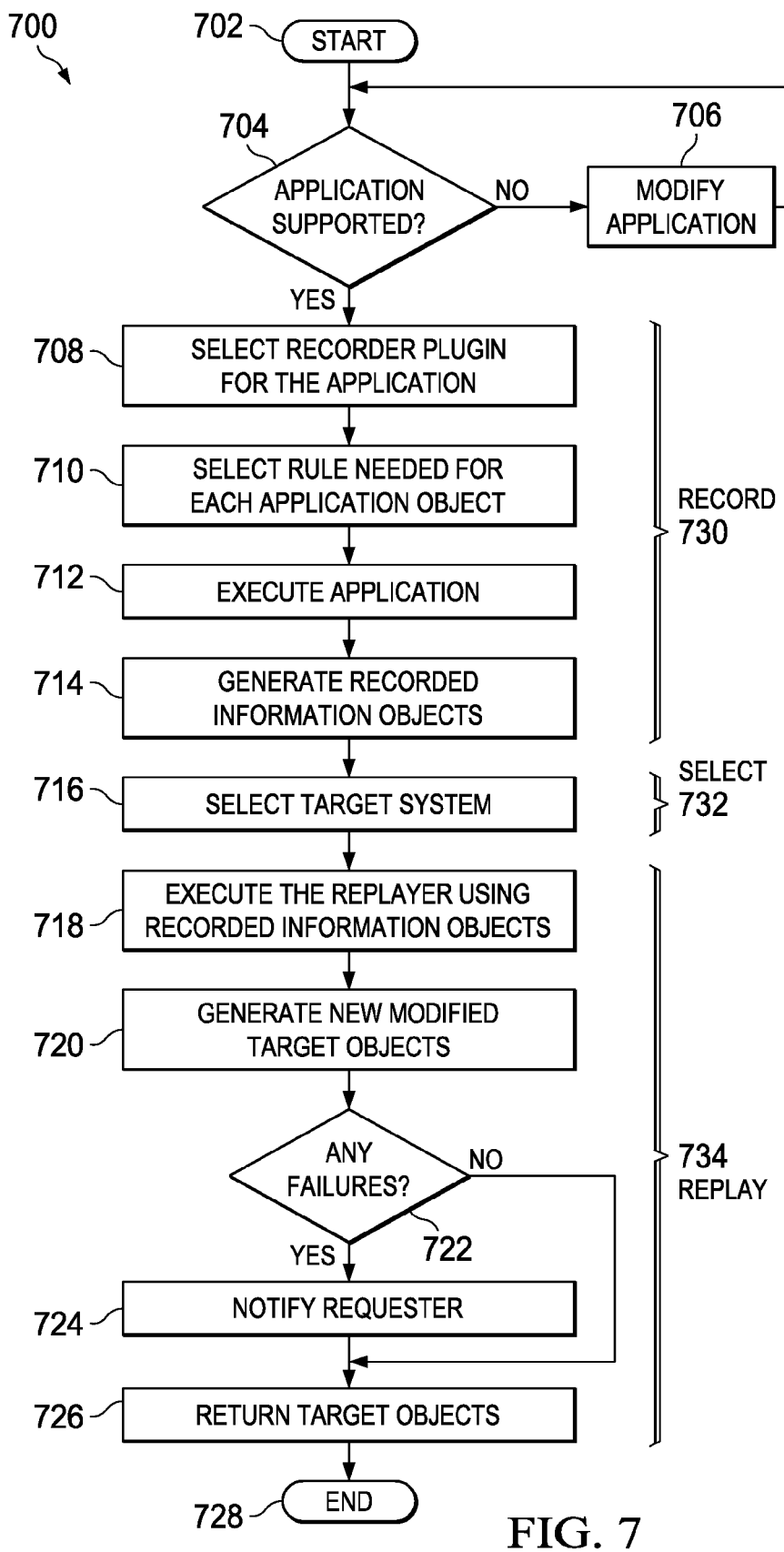
FIG. 7 is a flowchart of a record and replay process, in accordance with an illustrative embodiment.

With reference to FIG. 7, a flowchart of a record and replay process, in accordance with an illustrative embodiment, is shown. Process 700 is an example of using record and replay manager 302 of FIG. 3 within a system such as record and replay system 400 of FIG. 4.

Process 700 starts (step 702) and determines whether the application is aware of a recording requirement (step 704). When the application is aware, the application has been modified to aid in the recording of interaction information, and a "yes" is obtained. When the application is not aware, a "no" is obtained. When a "no" is obtained in step 704, modify application is required to use the recording and replay facilities (step 706). Once the application has been modified, process 700 can be used at step 704.

When a "yes" is obtained in step 704, select recorder plug-in for the application provides the proper recorder support for the application being recorded (step 708). Recorder plug-ins provide selectable flexibility to have the recorder support specific applications to reduce the possibility of errors during data collection.

To support objects within the specific application, select rules needed for each application object ensures the proper processing of application objects is supported (step 710). Rules have been established to support the proper interpretation of the application objects attributes and operations to provide generalized output in a domain aware context. The rules specify what will be recorded and the generalization.

The application is executed within the source system (step 712). The recorder applies the rules while the application is executing to generate recorded information objects (step 714). The specific application instance, the objects of the application to be recorded, and the attribute information related to each specified collectable object determine the data collected. The data collected is typically application-specific, but may include some system information. Recording phase 730 may be defined as comprising the steps 708-714.

Having obtained recorded information objects, a select target system is identified to indicate the environment in which the replay will occur (step 716). The selected system may be the same system or a different system, as required. For example, when replicating a system, a target system is typically the same type of system as the source system. When testing a migration scenario, a target system may be a very different system from the source system. In either case, the target environment characteristics are needed to ensure the appropriateness of the replay. Select phase 732 may be defined as comprising step 716.

Execute the replayer using recorded information objects processes the previously recorded information objects within the context of the target system domain (step 718). The replayer uses logic to process the previously recorded information in a generalized form, the logic taking into consideration the target environment differences, if any, from the source system. When the source and target systems are the same, there may be little need for context changes between the source system and target system. When source and target environments are very different, there may be considerable context mapping performed, as well as rule selection differences, to better ensure the possibility of a relevant replay. Domain knowledge of both source and target systems provides better support for the replay operation. Generate new modified target objects provides the objects in the context of the target (step 720). A determination as to whether any failures occurred (step 722) is performed to identify the need to inform the requester. If failures are determined, a "yes" result is obtained. If no failures are determined, a "no" result is obtained.

When a "yes" is obtained in step 722, notify requester is performed to make the requester aware of the failures (step 724). Return target objects to the requester sends, or makes available, the output of the replay to the requester (step 726). The output may also be stored in a file, with a location provided to the requester, or the output may be otherwise communicated to the requester in the form of a message or file transfer, as needed. Process 700 terminates thereafter (step 728). A replay phase 734 may be defined as comprising the steps 718-726.

When a "no" is obtained in step 722, return target objects (step 726) and termination (step 728) occur as stated previously.

Illustrative embodiments provide a capability to perform domain-aware recording and replay to record and replay user-interface test scripts for regression testing of the user-interface changes, to test proposed change of an installed system for an upgrade system where the system may be a physical system or building, and application of a change to multiple systems, as in replication. Applications are executed in a source system while application object changes are recorded using an application-aware recording process. The application-aware recording produces recorded information objects that may be replayed into a target system to produce changed application objects in the context of the domain of the target system.

The following example further illustrates application of illustrative embodiments and may be applied to user-interface test scenarios. Recording and replaying of user-interface test scripts is explained in the following example, while similar concepts may be applicable for other problem domains as well. Typical regression test tools are heavily dependent on the controls, screens, and associated layout. Sometimes, when a control is moved from one panel to another, or the type of control is changed from "checkbox to radio button" or "drop-down to a table control," the test scripts need to be re-written. In more complex changes, such as providing a new control button replacing a set of two controls, the change may cause the old test scripts to be ineffective, although there are no underlying functional changes. The reason for such a fragile situation is that the test scenario is represented in terms of surface-level user "clicks" rather than the internal function being invoked. This results in major effort in updating test cases, even between small point releases of applications, where the external input representation may often vary.

Maintenance of test cases is often a major problem because of additional effort needed for rewriting and re-validation. When the test cases are represented in terms of the internal impact or the underlying system function, such as "addTo cart," or "sort by price," even if the system has undergone some changes, one may identify how the same internal function is mapped in the new revised system, and appropriately modify the test cases too. For example, the test may be developed for leakage, as in heat dissipation of an IC chip, rather than a test of the external actions, such as "apply 7 Volts, measure current at pin 7." The internal representation may be "apply 405 more than rated voltage and measure current at the preamplifier output." As a result, the reapplication of an old test case may then involve mapping the old internal functions to new physical entities. In order to gather the internal representation, the application/domain-aware recorder can identify the relevant values and map to appropriate internal function and attributes.

The typical control level information recording of previous tools is determined by the syntax-based reliance on a physical structure rather than the application-aware recording used to identify and record functional elements and impacts, resulting in more maintainable and stable test systems.

The flowchart and block diagrams in the figures illustrate the architecture, functionality, and operation of possible implementations of systems, methods and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function, in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer implemented method for application-aware recording and replay of changes, the computer implemented method comprising:
    executing an application in a source system to form a first domain context, wherein source application objects have a capability of self-identification as candidates for recording and wherein an aware application aids in recording of interaction information;

generating recorded information objects from the application in the first domain context, by interrogating a candidate, using information including a specific application instance information, objects of the application to be recorded information and attribute information associated with each specified collectible object and wherein the recorded information objects differ in a level of abstraction from a logged object, and wherein the recorded information objects record changes using a functional manner;

selecting a target system having a second domain context;

replaying the recorded information objects on the target system to form new information objects in the second domain context; and returning the new information objects to a requester.

2. The computer implemented method of claim 1, further comprising:

determining whether the application is a supported application; and responsive to a determination that the application is not supported, defining a set of rules to support the application in the source system, wherein the set of rules specify what will be recorded and a generalization used.

3. The computer implemented method of claim 2, further comprising:

selecting a recorder plug-in, from a set of recorder plug-ins, for the application; and selecting the set of rules associated with the application in the source system for each application object, to be recorded, of the application.

4. The computer implemented method of claim 3, further comprising:

responsive to a determination that the application is not supported, defining a set of objects to be recorded in the application.

5. The computer implemented method of claim 1, wherein selecting the target system further comprises:

selecting one of, the second domain context is the same as the first domain context and the second domain context is different from the first domain context.

6. The computer implemented method of claim 1, wherein replaying the recorded information objects on the target system to form new information objects further comprises:

determining whether any failures occur; and responsive to a determination that failures occur, notifying the requester.

7. A data processing system for application-aware recording and replay of changes, the data processing system comprising:

a bus;

a memory connected to the bus, wherein the memory comprises computer-executable instructions;

a processor unit connected to the bus, wherein the processor unit executes the computer-executable instructions to direct the data processing system to:

execute an application in a source system to form a first domain context, wherein source application objects have a capability of self-identification as candidates for recording and wherein an aware application aids in recording of interaction information;

generate recorded information objects from the application in the first domain context, by interrogating a candidate, using information including a specific application instance information, objects of the application to be recorded information and attribute information associated with each specified collectible object and wherein the recorded information objects differ in a level of abstraction from a logged object, and wherein the recorded information objects record changes using a functional manner;

select a target system having a second domain context;

replay the recorded information objects on the target system to form new information objects in the second domain context; and return the new information objects to a requester.

8. The data processing system of claim 7, wherein the processor unit executes the computer-executable instructions to further direct the data processing system to:

determine whether the application is a supported application; and responsive to a determination that the application is not supported, define a set of rules to support the application in the source system, wherein the set of rules specify what will be recorded and a generalization used.

9. The data processing system of claim 8, wherein the processor unit executes the computer-executable instructions to further direct the data processing system to:

select the set of rules associated with the application in the source system for each application object, to be recorded, of the application.

10. The data processing system of claim 7, wherein the processor unit executes the computer-executable instructions to further direct the data processing system to:

select a recorder plug-in from a set of recorder plug-ins for the application.

11. The data processing system of claim 10, wherein the processor unit executes the computer-executable instructions to direct the data processing system further comprises:

responsive to a determination that the application is not supported, define a set of objects to be recorded in the application.

12. The data processing system of claim 7, wherein the processor unit executes the computer-executable instructions to direct the data processing system to select the target system further comprises:

select one of, the second domain context is the same as the first domain context and the second domain context is different from the first domain context.

13. The data processing system of claim 7, wherein the processor unit executes the computer-executable instructions to direct the data processing system to replay the recorded information objects on the target system to form new information objects further comprises:

determine whether any failures occur; and responsive to a determination that failures occur, notify the requester.

14. A computer program product for application-aware recording and replay of changes, the computer program product comprising:

a non-transitory computer-usable, recordable type medium having computer-executable instructions stored thereon, the computer-executable instructions comprising;

computer-executable instructions for executing an application in a source system to form a first domain context, wherein source application objects have a capability of self-identification as candidates for recording and wherein an aware application aids in recording of interaction information;

computer-executable instructions for generating recorded information objects from the application in the first domain context, by interrogating a candidate, using information including a specific application instance information, objects of the application to be recorded information and attribute information associated with each specified collectible object and wherein the recorded information objects differ in a level of abstraction from a logged object, and wherein the recorded information objects record changes using a functional manner;
computer-executable instructions for selecting a target system having a second domain context;
computer-executable instructions for replaying the recorded information objects on the target system to form new information objects in the second domain context; and
computer-executable instructions for returning the new information objects to a requester.

15. The computer program product of claim 14, further comprising:
computer-executable instructions for determining whether the application is a supported application; and
computer-executable instructions for responsive to a determination that the application is not supported, defining a set of rules to support the application in the source system, wherein the set of rules specify what will be recorded and a generalization used.

16. The computer program product of claim 15, further comprising:
computer-executable instructions for selecting the set of rules associated with the application in the source system for each application object, to be recorded, of the application.

17. The computer program product of claim 14, further comprising:
computer-executable instructions for selecting a recorder plug-in, from a set of recorder plug-ins, for the application.

18. The computer program product of claim 17, further comprising:
computer-executable instructions responsive to a determination that the application is not supported, for defining a set of objects to be recorded in the application.

19. The computer program product of claim 14, wherein computer-executable instructions for selecting the target system further comprises:
computer-executable instructions for selecting one of, the second domain context is the same as the first domain context and the second domain context is different from the first domain context.

20. The computer program product of claim 14, wherein computer-executable instructions for replaying the recorded information objects on the target system to form new information objects further comprises:
computer-executable instructions for determining whether any failures occur; and
computer-executable instructions responsive to a determination that failures occur, for notifying the requester.

* * * * *